Patented Oct. 2, 1945

2,386,033

UNITED STATES PATENT OFFICE 2,386,033

DRY SIZE

Fred L. Chappell, Jr., Kalamazoo, Mich., assignor to Hercules Powder Company, Wilmington, Del., a corporation of Delaware No Drawing. Application September 1, 1943, Serial No. 500,863

18 Claims. (Cl. 106—144)

This invention relates to dry rosin size compositions and a method of production. More particularly, it is concerned with a method of preparing a dry rosin size composition suitable for the preparation of aqueous size emulsions of the high free rosin type, and the resulting product.

For many years, papermakers have employed aqueous solutions or dispersions of the alkali metal salts of rosin almost exclusively for sizing purposes. More recently, however, rosin size dispersions having a high free rosin content have been finding favor because of their improved sizing efficiency and substantial manufacturing economies. While several methods of preparing these high free rosin type emulsions have been proposed, such as mechanically dispersing molten free rosin in water with the aid of an alkaline solution of casein, all of these methods require the papermaker to prepare the rosin size in situ. The papermaking art, generally speaking, prefers to purchase prepared rosin size including substantially neutral dry size. Dry rosin sizes have been prepared which may be added to the beater stock, but none has previously been known to be successful which contains a high percentage of free rosin.

Now, in accordance with this invention, a method has been found of preparing a dry rosin size composition suitable for the preparation of aqueous high free rosin size emulsions by admixing substantially neutral dry rosin size and a solid organic acid anhydride. Thus, in accordance with this invention, a dry size composition suitable for the preparation of aqueous high free rosin size emulsions is prepared comprising substantially neutral dry rosin size and a solid organic acid anhydride. If desired, a dry proteinaceous protective colloid may be included in the composition. Emulsions of the high free rosin type may thereafter be prepared from the dry rosin composition by simply introducing the same into the required amount of water accompanied by vigorous agitation.

Now, having indicated in a general way the nature and purpose of this invention, the following examples will illustrate the invention. It is to be understood, however, that such examples are presented merely as illustrations of the invention and are not to be construed as limiting the same. In the examples, the ingredients are given in parts by weight unless otherwise indicated.

Example 1

2 parts of phthalic anhydride of less than 30 mesh but greater than 80 mesh size were thoroughly mixed with 21.0 parts of dry neutral rosin size of commercial grade to which had been added 0.1 part of dry soda ash to insure complete freedom from unneutralized rosin. This dry mixture was then added with agitation to 400 parts of water at room temperature, and agitation continued until reaction was complete, as evidenced by the absence of undissolved particles of the anhydride. The resulting high free rosin emulsion was resistant to the formation of a floc when diluted with hard water to 0.05% solids concentration. Paper was made by sheeting and drying pulp upon which the high free rosin emulsion had been precipitated by the addition of papermaker's alum. The resultant paper was markedly superior in the degree of sizing resistance imparted thereto as compared to a similar sheet sized under identical conditions with a solution of the dry neutral rosin size of commercial grade.

Example 2

The procedure of Example 1 was repeated but in this instance the high free rosin emulsion was prepared by dissolving in the water a dry composition obtained by thoroughly mixing 1.2 parts of dry sodium caseinate with the dry neutral rosin size, dry soda ash, and phthalic anhydride. Similarly, good results were obtained with the high free rosin emulsion both in respect to resistance to formation of floc on dilution with hard water and in the sizing of paper.

Example 3

0.3 part of phthalic anhydride, flake variety, and 0.35 part of dry sodium caseinate were thoroughly mixed with 4.35 parts of dry neutral rosin size of commercial grade. This dry mixture was then added to 57.50 parts of water with vigorous agitation and the temperature slowly raised to 40–45° C. When solution was complete, 37.50 parts of water were added to the high free rosin emulsion. The resulting emulsion was resistant to the formation of a floc when further diluted with hard water to 0.05% solids concentration. Paper sized with the emulsion was markedly superior in the degree of sizing resistance imparted thereto as compared to a similar sheet sized under similar conditions with a solution of a dry neutral rosin size of commercial grade.

Example 4

1 part of succinic anhydride in the form of small lumps and 1.6 parts of dry sodium caseinate were thoroughly mixed with 21.0 parts of dry neutral rosin size. This dry mixture was added with agitation to 400 parts of water at room temperature and agitation continued until reaction was completed. The resulting high free rosin emulsion was resistant to the formation of a floc when diluted with hard water to 0.05% solids concentration.

The dry compositions or mixtures are prepared by thoroughly mixing together in particle form substantially neutral dry rosin size and a solid organic acid anhydride. A dry, proteinaceous protective colloid, if desired, may be included in the rosin size composition for the purpose of stability of the subsequently prepared high free rosin emulsions.

Although in the examples, phthalic and succinic anhydride have been used, any solid organic acid anhydride which is sufficiently acid in aqueous solution to react with neutralized rosin, e. g., glutaric anhydride, terpene maleic anhydride, maleic anhydride, maleic rosin adduct and its partial esters, etc., may be employed according to this invention. Phthalic anhydride, however, is usually preferred because of its availability and high speed of reaction with a neutralized rosin. The proportion in which such anhydrides are employed varies somewhat with the strength of the particular anhydride, the use or nonuse of a proteinaceous protective colloid, the high free rosin content required and the desired degree of stability to floccing in the finished emulsions. In general, from about 5% to about 15%, preferably from about 6% to about 12%, of the solid organic acid anhydride, based on the dry weight of a neutralized rosin, may be employed depending on the amount of free rosin desired in the emulsion. The use of an excess of the anhydride, i. e., sufficient to reduce the pH of the aqueous free rosin dispersions to below about pH 6–7 should be avoided in order to obtain maximum stability to floccing.

As mentioned above, if desired, a proteinaceous protective colloid may be included in the dry composition. The colloid may be, for example, dry casein, dry soybean protein, or the dry water-soluble salts, etc. In general, the amount employed in the preparation of the dry rosin composition will range from about 0 to about 8%, based on the dry weight of the neutralized rosin.

The rosin which is contained in the dry rosin size may be derived from any of the various grades of wood or gum rosin or the rosin acids contained therein, as abietic acid, pimaric acid, sapinic acid, etc.

The substantially neutral dry rosin size may be prepared by a number of methods, the most convenient of which is that described in U. S. Patent 2,134,911. Such method essentially comprises introducing a concentrated aqueous alkali solution into molten rosin contained in an autoclave and heated to a temperature of about 275° F., after which the mixture is heated to 375° F. and under autogenous pressure of the mixture until the neutralization reaction is complete. The mixture is then discharged into a drying atmosphere under its own pressure, whereby it is instantly desiccated to a dry finely-divided powder. If desired, a small amount of dry soda ash, for example, may be mixed with the dry rosin size to insure the absence of unneutralized rosin therein.

As the effectiveness of the dry compositions in the production of aqueous emulsions of the high free rosin type depends to a large extent on the lack of acid character of the solid organic acid anhydride until reacted with water and also on the very limited water solubility of the same, it is essential that the particle size of the acid anhydride be such that will allow complete solution of the dry rosin size and, if present, of the dry proteinaceous protective colloid, before any appreciable amount of acid is developed in the water through solution of the acid anhydride. For example, the particle size for phthalic anhydride to be dissolved at about room temperature should not be substantially below about 80 mesh and is preferably about 20–40 mesh.

The dry rosin size compositions are prepared by thoroughly mixing together by any of the well-known methods neutral, dry rosin size and a solid organic acid anhydride, for example, phthalic. If desired, a dry proteinaceous protective colloid may also be included. To insure complete neutralization of the rosin in the dry rosin size, a small amount of dry soda ash, for example, may be added to the dry size as illustrated in Example 1, but this is not essential. It is important that the mixtures be in an essentially dry state, i. e., they should not contain over about 5% of water and preferably less than 2%. This dry condition may be protected if, for example, the dry rosin composition is to be stored in a humid atmosphere by coating the solid organic anhydride with a moisture-proof agent. It is preferable that the ingredients of the dry mix be vacuum dried.

In the preparation of the high free rosin emulsions, the dry composition may be added to the total requirement of water or, if desired, to a portion thereof only to form a paste to which the remainder of the water may be added to complete solution of the composition. In the latter case, the first portion of the water may be cooled and the remainder hot. The high free rosin emulsions may be made containing from about 1–20%, preferably from about 5–15% of solids. A preferred method of preparing the emulsions is to dissolve the dry composition in an amount of water which will give a solids concentration of about 5–15% and when reaction between the neutralized rosin and the acid from the anhydride is practically complete, sufficient water is added to reduce the solids concentration to about 1–8%. This procedure offers the advantage of comparatively complete reaction at the higher concentrations, whereas the lower concentrations are not favorable to stability of the final emulsion, i. e., there is less tendency at higher concentrations for the dispersed rosin particles to agglomerate and settle out.

As previously mentioned, vigorous agitation is used in dissolving the dry compositions, and this is desirable from the standpoint of avoiding the likelihood of the formation of local areas of high acidity in the aqueous mixture which may result in the precipitation of the free rosin as agglomerates thereof, and, in the precipitation of the proteinaceous colloid, if present. Vigorous agitation also tends toward the desirable production of smaller rosin particles in the dispersion.

The temperature at which the dissolving operation is carried out is also important and in this respect temperatures in excess of 50–60° C. should not be used in order to avoid coalescence of the free rosin particles to the extent that a precipitate of rosin is formed. Lower temperatures, i. e., room temperature, are preferable although after the dry rosin size and the proteinaceous colloid have been dissolved, the temperature may be raised to about 40–45° C. in order to obtain faster reaction between the acid from the anhydride and the neutralized rosin.

The dry rosin size compositions prepared according to this invention may also contain an oxidation inhibitor to prevent their oxidation or combustion. Such antioxidants as phenyl-beta-naphthyl amine, eugenol, azo-benzene, etc., have been found useful.

The dry rosin size composition prepared according to the method of this invention may be stored in paper bags and easily handled. It has decided advantages from an economical standpoint as the rosin size composition is substantially free from moisture so that transportation charges are considerably less than, for example, on paste type sizes which contain about 30% of water. Furthermore, the paper maker can prepare these high free rosin type sizes in the exact quantities desired on the premises without the necessity of technical skill or machinery by merely adding the dry rosin size composition to water.

What I claim and desire to protect by Letters Patent is:

1. A dry rosin size composition suitable for the preparation of aqueous high free rosin size emulsions comprising substantially neutral dry alkali metal saponified rosin size and a solid organic acid anhydride in amounts insufficient to bring the pH of the mixture dispersed in aqueous media to below 6.0.

2. A dry rosin size composition suitable for the preparation of aqueous high free rosin size emulsions comprising substantially neutral dry alkali metal saponified rosin size and from about 5% to about 15% by weight of the rosin size, of phthalic anhydride.

3. A dry rosin size composition suitable for the preparation of aqueous high free rosin size emulsions comprising substantially neutral dry alkali metal saponified rosin size, phthalic anhydride, and a dry proteinaceous protective colloid, the amount of said anhydride being from about 5% to about 15% by weight of the rosin size.

4. A dry rosin size composition suitable for the preparation of aqueous high free rosin size emulsions comprising substantially neutral dry alkali metal saponified rosin size, phthalic anhydride, and sodium caseinate, the amount of said anhydride being from about 5% to about 15% by weight of the rosin size.

5. A dry rosin size composition suitable for the preparation of aqueous high free rosin size emulsions comprising substantially neutral dry alkali metal saponified rosin size and from about 5% to about 15% by weight of the rosin size, of succinic anhydride.

6. A dry rosin size composition suitable for the preparation of aqueous high free rosin size emulsions comprising substantially neutral dry alkali metal saponified rosin size, succinic anhydride, and a dry proteinaceous protective colloid, the amount of said anhydride being from about 5% to about 15% by weight of the rosin size.

7. A dry rosin size composition suitable for the preparation of aqueous high free rosin size emulsions comprising substantially neutral dry alkali metal saponified rosin size, succinic anhydride, and sodium caseinate, the amount of said anhydride being from about 5% to about 15% by weight of the rosin size.

8. A dry rosin size composition suitable for the preparation of aqueous high free rosin size emulsions comprising substantially neutral dry alkali metal saponified rosin size and from about 5% to about 15% by weight of the rosin size, of maleic anhydride.

9. A dry rosin size composition suitable for the preparation of aqueous high free rosin size emulsions comprising substantially neutral dry alkali metal saponified rosin size, maleic anhydride, and a dry proteinaceous protective colloid, the amount of said anhydride being from about 5% to about 15% by weight of the rosin size.

10. A dry rosin size composition suitable for the preparation of aqueous high free rosin size emulsions comprising substantially neutral dry alkali metal saponified rosin size, maleic anhydride, and sodium caseinate, the amount of said anhydride being from about 5% to about 15% by weight of the rosin size.

11. A dry rosin size composition suitable for the preparation of aqueous high free rosin size emulsions comprising substantially neutral dry alkali metal saponified rosin size and from about 5% to about 15% by weight of the rosin size, of a solid organic acid anhydride, said mixture containing less than 5% of water.

12. A dry rosin size composition suitable for the preparation of aqueous high free rosin size emulsions comprising substantially neutral dry alkali metal saponified rosin size and from about 5% to about 15% by weight of the rosin size, of a solid organic acid anhydride, said mixture containing less than 2% of water.

13. A dry rosin size composition suitable for the preparation of aqueous high free rosin size emulsions comprising substantially neutral dry alkali metal saponified rosin size and a solid organic acid anhydride in amounts of from about 6% to about 12% by weight of the dry rosin size.

14. A dry rosin size composition suitable for the preparation of aqueous high free rosin size emulsions comprising substantially neutral dry alkali metal saponified rosin size and a solid organic acid anhydride in amounts of from about 5% to about 15% by weight of the dry rosin size.

15. A dry rosin size composition suitable for the preparation of aqueous high free rosin size emulsions comprising a substantially neutral dry alkali metal saponified rosin size containing a slight excess of alkali and a solid organic acid anhydride in amounts insufficient to bring the pH of the mixture dispersed in aqueous media to below 6.0.

16. A dry rosin size composition suitable for the preparation of aqueous high free rosin size emulsions comprising substantially neutral dry alkali metal saponified rosin size, a solid organic acid anhydride and not more than 8% of a proteinaceous protective colloid, the amount of said anhydride being from about 5% to about 15% by weight of the rosin size.

17. A dry rosin size composition suitable for the preparation of aqueous high free rosin size emulsions comprising substantially neutral dry alkali metal saponified rosin size, a solid organic acid anhydride and an antioxidant, the amount of the said anhydride being from about 5% to about 15% by weight of the rosin size.

18. A dry rosin size composition suitable for the preparation of aqueous high free rosin size emulsions comprising substantially neutral dry alkali metal saponified rosin size and from about 5% to about 15% by weight of the rosin size, of phthalic anhydride having a particle size of from 20 to 40 mesh.

FRED L. CHAPPELL, Jr.